(12) United States Patent
Murawa

(10) Patent No.: US 6,402,052 B1
(45) Date of Patent: Jun. 11, 2002

(54) PRESSURE SENSITIVE WINDSHIELD WASHER NOZZLE

(75) Inventor: John S. Murawa, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/935,947

(22) Filed: Aug. 24, 2001

(51) Int. Cl.$^7$ ................ B05B 1/10; B60S 1/46
(52) U.S. Cl. ................ 239/284.1; 239/284.2; 239/436; 239/443; 239/447; 239/551; 239/562; 239/533.1; 239/569; 239/570
(58) Field of Search ............ 239/284.1, 284.2, 239/436, 443, 445, 446, 447, 551, 562, 533.1, 569, 570

(56) References Cited

U.S. PATENT DOCUMENTS 4,768,716 A  9/1988  Buchanan, Jr. et al. .. 239/284.1
5,012,977 A  5/1991  Karklins et al. ......... 239/284.1

Primary Examiner—Robin O. Evans
(74) Attorney, Agent, or Firm—Laura C. Hargitt

(57) ABSTRACT

A windshield washer nozzle for an automotive vehicle, including a housing for retaining the nozzle, at least one fluid input port defined by the housing; and at least a first flow path and a second flow path defined by the housing in fluid communication with the fluid input port. Separate pressure flow control valves are retained in the first flow path and the second flow path, wherein fluid at a pressure below a pressure P1 can be directed through the input port and caused to flow through the first flow path, although flow is blocked through the second flow path. Alternatively, fluid in excess of a pressure P2 can be directed through the input port and caused to flow through the second flow path while flow is blocked through the first flow path.

11 Claims, 2 Drawing Sheets

PRESSURE SENSITIVE WINDSHIELD WASHER NOZZLE

TECHNICAL FIELD

This invention relates to a nozzle for an automotive vehicle windshield washer system. More particularly, this invention relates to a pressure sensitive nozzle for an automotive vehicle windshield washer system having a low pressure output port and a high pressure output port, wherein both the high pressure and low pressure ports include separate pressure flow control valves, one which allows the low pressure output port to operate at a pressure below a pressure P1 and the high pressure output port to operate at a pressure above a pressure P2.

BACKGROUND OF THE INVENTION

Windshield washer nozzles may include a fluid input port coupled to a reservoir or source of washer fluid and an outlet port closed by a spring loaded check valve. The check valve typically rests against a seat in a normally closed position, blocking fluid flow to the output port. The spring is generally designed to open or unseat the check valve at a predetermined pressure to allow fluid to flow to the outlet port. The fluid pressure required to unseat the check valve can be provided by an electric pump or DC motor, which delivers a cleaning fluid to the windshield through the nozzle.

The pump generally generates a nominally constant pressure in the fluid sufficient to force the check valve off the seat, and to force the fluid through the nozzle at a certain nominal velocity. The nozzle is typically constructed to direct the fluid at a particular target area of the windshield. However, the fluid, once free of the nozzle, may be subjected to the force of air moving across the vehicle windshield. This air, at high vehicle speeds, can change the trajectory of the fluid, thereby dislocating it from its intended path.

On the other hand, if the nozzle is directed to place the cleaning fluid on the windshield at a target area selected based on a high vehicle speed, at low vehicle speeds the nozzle tends to project the fluid higher on the windshield, or in extreme cases, completely over the windshield onto the vehicle roof or the side of the vehicle when the vehicle is at rest.

A window washer system for adjusting the output from the windshield washer nozzle when the vehicle is traveling at low or high speeds is known. In this known arrangement, the pressure of the washer fluid pump increases with vehicle speed, and causes the washer fluid to be propelled from a reservoir through a nozzle under a pressure sufficient to direct the fluid to a predetermined target area on the windshield.

However, it may be desirable to provide an improved pressure sensitive windshield washer system that permits windshield washer fluid to be directed to different target locations on the windshield through selectively positioned output nozzles.

SUMMARY OF THE INVENTION

The present invention is directed to a windshield washer nozzle for an automotive vehicle. The windshield washer nozzle includes a housing, at least one fluid input port defined by the housing and at least a first flow path and a second flow path defined by the housing in fluid communication with the fluid input port. Fluid at a pressure below a pressure P1 may be directed through the input port and caused to flow through the first flow path while fluid flow is blocked through the second flow path. Fluid at a pressure in excess of a pressure P2 may be directed through the input port and caused to flow through the second flow path while fluid flow through the first flow path is blocked. The first flow path directs a fluid spray to a first target location on the automotive vehicle windshield, and the second flow path directs a fluid spray to a second target location on the automotive vehicle windshield, wherein at least a portion of the second target location is at a higher position on the windshield than the first target location.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
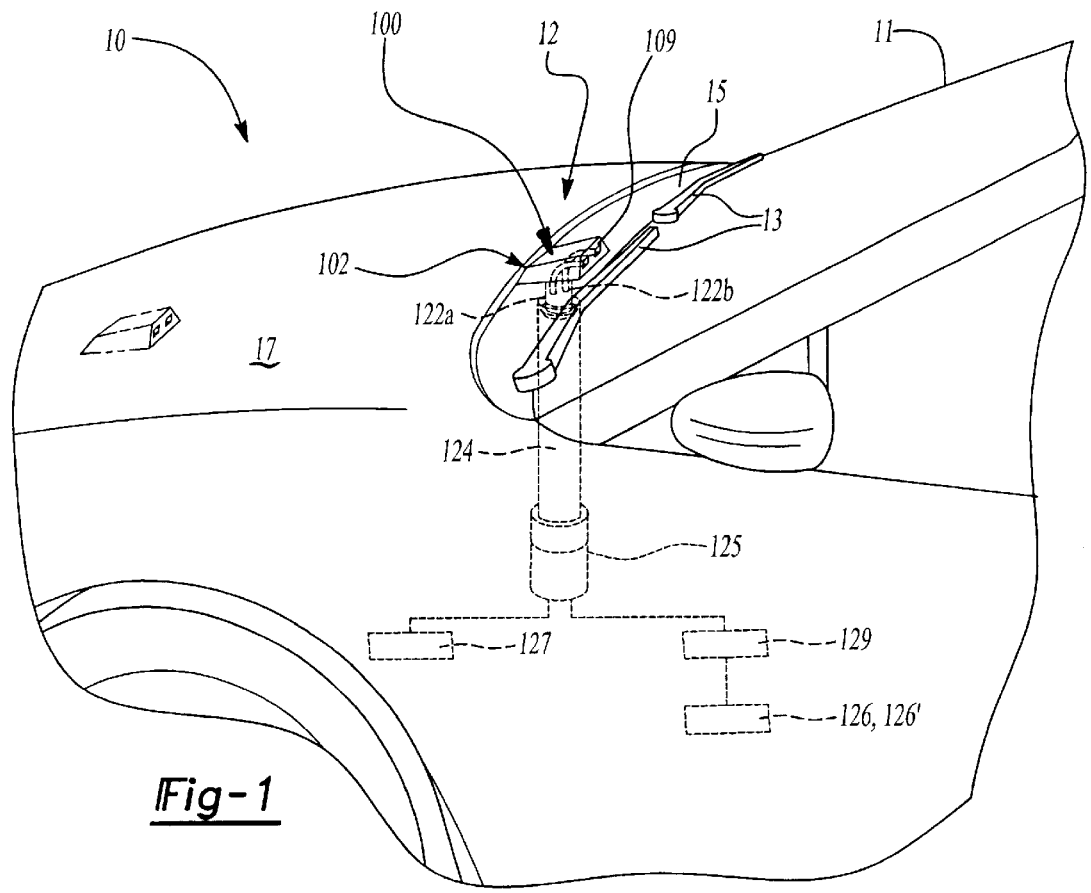
FIG. 1 is a perspective view of a pressure sensitive nozzle for an automotive vehicle windshield washer system formed in accordance with the teachings of this invention.

Referring to FIG. 1, a motor vehicle 10 has a windshield washer assembly 12 used in conjunction with a pump 125 for applying a cleaning fluid to the windshield 11 and wipers 13 for wiping the windshield clean. The windshield washer assembly 12 includes a pressure sensitive nozzle 100 for receiving the cleaning fluid under pressure from the pump 125. One or more nozzles 100 may be used for a single automotive vehicle 10. For instance, a single nozzle 100 may be placed on the right side of the vehicle 10 and another on the left side of the vehicle 10. For illustrative purposes, a single nozzle 100 will be described herein.

Figure 2:
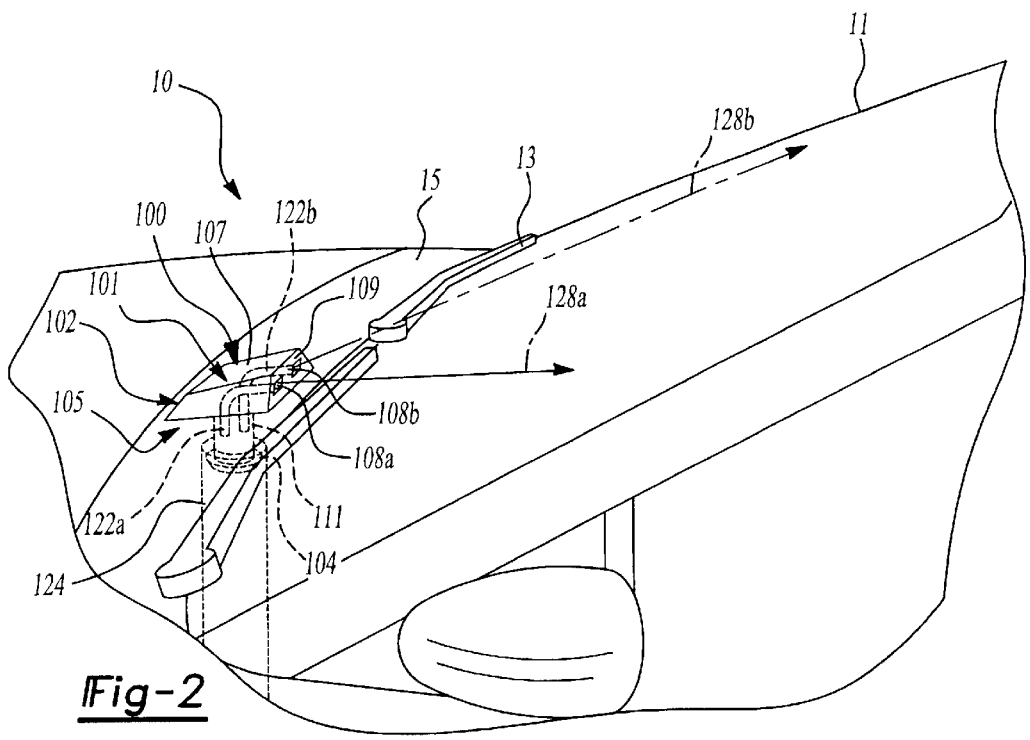
FIG. 2 is a perspective view of the nozzle shown in FIG. 1 mounted on the air inlet panel of the automotive vehicle and illustrating the output spray patterns from the nozzle output ports.

As shown in FIG. 2, the nozzle 100 includes a housing 102 having an upper portion 101 and a lower portion 105. The upper portion 101 may include a body 107 having a substantially rectangular configuration; however, it will be appreciated that other geometric configurations can be used. The body 107 may include a first surface 109 defining two fluid output ports 108a, 108b in the form of openings defined in the first surface 109. The output ports 108a, 108b can be formed in the first surface 109 using known machining or molding techniques.

Figure 3:
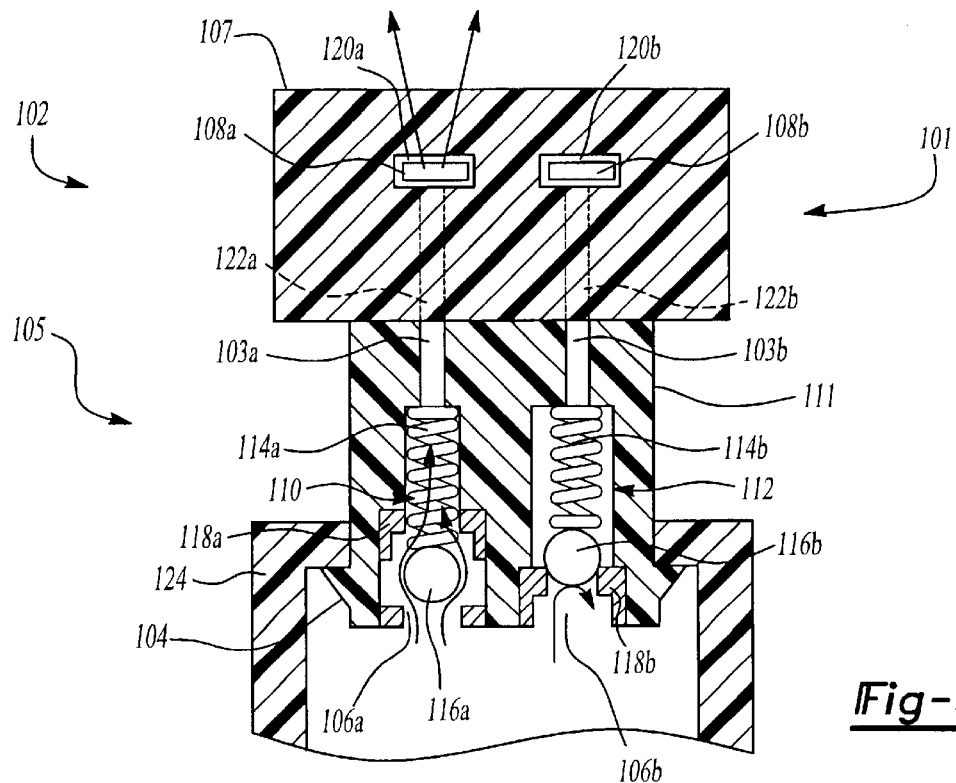
FIG. 3 is a section view of the nozzle shown in FIG. 1, illustrating the output spray pattern through the low pressure output port.
Figure 4:
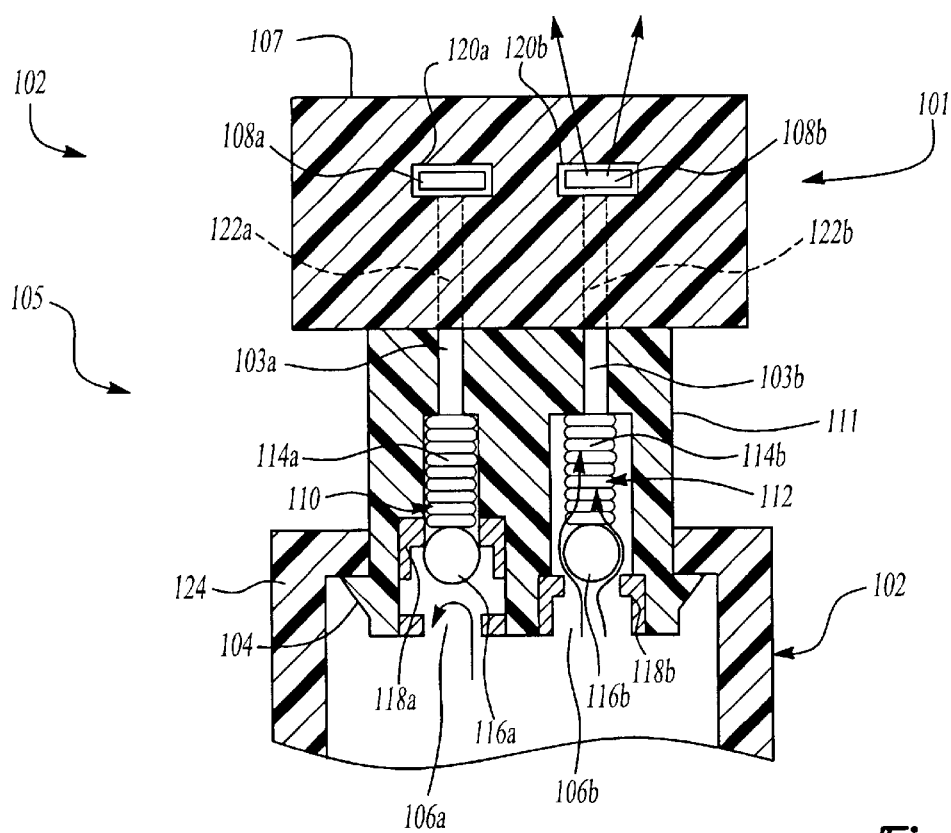
FIG. 4 is a section view of the nozzle shown in FIG. 1, illustrating the output spray pattern through the high pressure output port.

Each output port 108a, 108b is closed by an output spray nozzle 120a, 120b, each output spray nozzle 120a, 120b being of a type known in the industry. Each nozzle 120a, 120b is supported within the opening defining the output port 108a, 108b in accordance with known techniques. For instance, each output spray nozzle 120a, 120b can be snapped into place in output port 108a, 108b, and held in place by frictional forces. As best seen in FIGS. 3 and 4, each output spray nozzle 120a, 120b is positioned in the first surface 109 to allow the cleaning fluid to be directed against the windshield 11 at different target areas on the windshield 11. As shown in FIG. 2, the output spray from output spray nozzle 120a is directed to a lower position on the windshield 11 than the output spray from output spray nozzle 120b. It will be appreciated that the output spray pattern can vary as to the height and width across the windshield 11.

FIGS. 1–4 also show two substantially parallel cavities 122a, 122b extending through a portion of the body 107. The cavities 122a, 122b may be formed in the body 107 using known machining or molding techniques, and define separate flow paths 122a, 122b through the body 107. As best seen in FIGS. 3–4, one end of the respective flow paths 122a, 122b is in fluid communication with the respective output spray nozzle 120a, 120b. The opposite end of each flow path 122a, 122b is in fluid communication with separate flow paths formed in the lower portion 105 so as to form a single continuous flow path through the housing 102 (discussed below).

Turning now to the lower portion 105 of the housing 102, as best seen in FIGS. 3–4, the lower portion includes a cylindrically shaped sidewall 111 that extends downward from the upper portion 101. It will be appreciated that the sidewall 111 can be coupled to the air inlet panel 15 or hood 17 of the automotive vehicle 10 using an interference fit. For instance, the sidewall 111 can be attached to the air inlet panel 15 or the hood 17 using a snap-in fit.

The sidewall 111 defines a hose connection 104 for accommodating a single input hose 124 from a conventional windshield washer fluid pump 125. The hose connection 104 may be an outwardly projecting barb as illustrated in FIGS. 3–4. One end of the hose 124 is coupled to the hose connection 104 using an interference fit. For instance, the hose 124 can slide over the hose connection 104 so that the hose 124 is held in place by frictional forces. Alternatively, the hose 124 could support mating threads that mate with threads formed on the hose connection 104.

As best seen in FIG. 1, the opposite end of the hose 124 is coupled to the pump 125 also using known techniques. For instance, the end of the hose 124 can be pushed over an outwardly projecting barb supported by the pump 125 outlet and held in place by frictional forces. Alternatively, the end of the hose 124 could support threads that engage mating threads supported by the pump 125. The pump 125 is placed in fluid communication with a reservoir 127 containing a supply of cleaning fluid.

As best seen in FIGS. 3–4, immediately adjacent the hose connection 104, a portion of the sidewall 111 defines two separate fluid input ports 106a, 106b through which fluid from the pump 125 can be directed. Each fluid input port 106a, 106b is in fluid communication with a respective flow path 103a, 103b defined by the sidewall 111. Each flow path 103a, 103b extends substantially through the sidewall 111, and includes one end that aligns with the respective flow path 122a, 122b defined by the upper portion 101 so as to form two continuous flow paths through the upper and lower 101, 105 portion of the housing 102. The flow paths 103a, 103b are isolated from one another by the internal structure of the lower portion 105, and each flow path 103a, 103b can be formed in the sidewall 111 using known machining or molding techniques.

The flow path 103a is a low pressure flow path, and supports a low pressure flow control valve 110, also known as a check valve, using known techniques. The low pressure flow control valve 110 includes a spring 114a in contact with a ball check 116a using known techniques and a seat 118a upon which the ball check 116a rests to close the flow path 103a. As best seen in FIG. 3, the seat 118a is defined by a portion of the lower portion 105, wherein the seat 118a extends out into the flow path 103a.

FIG. 3 shows the low pressure flow control valve 110 in the normally open position. In the normally open position, the spring 114a biases the ball check 116a away from the seat 118a when the fluid pressure in the hose 124 is below a predetermined pressure level P1, thus allowing fluid to flow through the flow path 103a at this hose pressure below pressure P1. When the fluid pressure in the hose 124 exceeds a preselected value, e.g., P1, the fluid pressure acting against the ball check 116a moves the ball check 116a into contact with the seat 118a, causing compression of the spring 114a. This arrangement results in the blockage of fluid flow through flow path 103a as illustrated in FIG. 4 where P is greater than P1, and P1 can be equal to P2.

The flow path 103b is a high pressure flow path, and supports a high pressure flow control valve or check valve 112 using known techniques. The high pressure flow control valve 112 is identical in construction to the low pressure flow control valve 110, and includes a spring 114b in contact with a ball check 116b using known techniques and a seat 118b against which the ball check 116b is seated to close the flow path 103b. As best seen in FIG. 3, the high pressure flow control valve 112 is a normally closed valve such that the spring 114b biases the ball check 116b against the seat 118b to block fluid flow through the valve 112 when the fluid pressure in the hose 124 is below a pressure P2. When the fluid pressure in the hose 124 exceeds a pressure P2, the fluid pressure acting against the ball check 116b forces the ball check 116b off the seat 118b, resulting in compression of the spring 114b, as best seen in FIG. 4. This arrangement permits fluid flow through the flow path 103b.

OPERATION

The pump 125 is rotated in both the forward and reverse directions to generate the pressures needed to direct flow through either the low pressure flow path 103a or the high pressure flow path 103b. When rotated in the forward direction, the pump 125 can generate a maximum forward pressure $P_{forward}$; when rotated in the reverse direction, the pump 125 can generate a maximum reverse pressure $P_{reverse}$ equal to some percentage of the pressure $P_{forward}$, wherein the maximum reverse pressure $P_{reverse}$ can be determined by the formula:

$$P_{reverse} = (n)(P_{forward}),$$

where n has a value less than or equal to one. In the disclosed embodiment, the pressure $P_{reverse}$ equals approximately 0.55 $(P_{forward})$.

The transition of the pump 125 from a forward rotation to the reverse direction can be controlled manually, via computer or by electronic switching. For instance, to affect computer control of the forward-reverse transition of the pump 125, the pump 125 could be electrically coupled to the vehicle electrical control center 126, wherein the electrical control center 126 monitors the speed of the automotive vehicle 10. The electrical control center 126 can include a microprocessor or computer 126' to which the pump 125 is electrically connected. For example, the pump 125 could be coupled to the microprocessor 126' using an output driver or other similar device. At a predetermined speed, the microprocessor 126' generates a signal in accordance with pre-programmed software logic instructions that changes the pump's direction of rotation.

Alternatively, a relay or other electrical or electronic device 129 could be used to couple the pump 125 to the electrical control center 126. This arrangement permits the electrical control center 126 to generate a control signal routed through the electrical or electronic device 129 to the pump 125. Depending on the nature of the electrical signal, the pump 125 can be caused to automatically rotate in either the reverse or forward direction.

The vehicle speed at which the rotation of the pump 125 changes from a reverse to a forward rotation, and thereby causing a transition from the low to the high pressure side of the nozzle 100, can be uniquely selected for a particular vehicle. For instance, the vehicle speed for pump rotation transition can depend on the body type of the vehicle, including, but not limited to, the vehicle's aerodynamic characteristics.

To operate the nozzle 100, two different operating pressures are required: one less than a selected pressure P1 and the other greater than a second pressure P2. The generation of the pressures P1 and P2 can be accomplished using the pump 125. The pressures P1 and P2 can be selected based on the values of the pressures $P_{forward}$ and $P_{reverse}$. The pressure P1 can include any value greater than or equal to the maximum reverse pressure but less than or equal to the pressure P2, and the pressure P2 can include any value less than or equal to the maximum forward pressure but greater than or equal to P1.

The selection of the pressures P1 and P2 will also depend upon the value of the spring tension of each spring 114a, 114b placed in the flow control valves 110, 112. For instance, the selection of a pressure P1 that generates a force on the spring 114a less than the spring tension will cause the spring 114a to bias the ball check 116a away from the seat 118a. Likewise, the selection of a pressure P2 that generates a force component on the spring 114b equal to or in excess of the spring tension will cause the spring 114b to bias the ball check 116b away from the seat 118b.

ILLUSTRATIVE EXAMPLE

The pressures P1 and P2 for purposes of this example are 22 PSI and 25 PSI, respectively. Also, for purposes of this example, the pump 125 can generate a maximum fluid pressure of approximately 35 PSI in the forward direction, resulting in a maximum fluid pressure of approximately 19.25 PSI in the reverse direction. It will be appreciated that different size pumps could be used, which could result in different maximum pressure ranges.

Furthermore, for purposes of this example, the pump 125 is coupled to the vehicle electrical control center 126 via an electronic device 129 such as a relay. When the automotive vehicle is operating at speeds below 40 MPH, the electrical control center 126 causes the electronic device 129 to send a signal to the pump 125 that causes the pump 125 to operate in the reverse direction. The spring 114a can be chosen with a spring tension that allows the ball check 116a to remain off the seat 118a as long as the fluid pressure is below pressure P1.

In this example, when the automotive vehicle is operated at vehicle speeds below 40 MPH, the pump is operated in the reverse direction, and the hose fluid pressure remains below the pressure P1, 22 PSI. As a result, activation of the nozzle 100 by operating a control switch, which is located on the vehicle 10 for convenient access by the vehicle operator, causes the cleaning fluid to flow through the low pressure flow path 103a, as shown in FIG. 3. Although a single control switch is described for activating the nozzle 100, one of skill in the art will appreciate that one or more control switches could be used to activate the nozzle 100. At the low pressure flow path 103a, the spring 114a biases the ball check 116a away from the seat 118a, and at the high pressure flow path 103b, the spring 114b biases the ball check 114b against the seat 118b. This arrangement permits fluid flow through the flow path 103a while simultaneously blocking flow through the high pressure flow path 103b.

FIG. 2 shows the output spray pattern generated by the low pressure output spray nozzle 120a. The output spray pattern is directed toward a target location on the lower portion of the windshield 11, shown by reference line 128a. The output spray pattern from the output spray nozzle 120a is a dispersion type spray pattern. That is, the fluid is directed from the output spray nozzle 120a such that the fluid fans out across the windshield 11. One of skill in the art would appreciate that the spray pattern could be set up as a stream type flow pattern using known techniques to convert or replace the nozzle 100.

At vehicle speeds at or above 40 MPH, the relay can send a signal causing the pump 125 to operate in the forward direction, thus permitting the pump 125 to produce a maximum fluid pressure in excess of the pressure P1, 22 PSI. When the pressure exceeds P1, the low pressure flow path 103a closes, as the fluid pressure causes the ball check 116a to rest against the seat 118a.

However, at the high pressure flow path 103b, the spring 114b can have a spring tension that permits the spring 114b to bias the ball check 116b into sealing contact with the seat 118b as long as the fluid pressure is below the pressure P2, 25 PSI. When the fluid pressure exceeds the pressure P2, the pressurized fluid forces the ball check 116b off the seat 118b, allowing fluid to flow through the high pressure flow path 103b while flow is blocked through the low pressure flow path 103a, as best seen in FIG. 4. As a result, activation of the nozzle 100 by operating the control switch causes the cleaning fluid to flow through only the high pressure flow path 103b.

FIG. 4 shows a dispersion type output spray flow pattern through the high pressure output spray nozzle 120b. As previously described, this dispersion type output spray pattern can be converted to a stream type pattern by using known techniques to adjust or replace the nozzle 100. As best seen in FIGS. 2 and 4, at least a portion of the output spray pattern from the high pressure output spray nozzle 120b is directed to a higher location on the windshield 11 than the output spray from the low pressure output spray nozzle 120a, as illustrated by reference line 128b in FIG. 2.

Thus, the invention provides a multi-output windshield washer nozzle that permits the windshield washer fluid to be directed toward at least two or more target locations on the windshield in accordance with the speed of the vehicle and the pressure of the windshield washer fluid pump 125.

A preferred embodiment of the present invention has been disclosed. A person of ordinary skill in the art would realize, however, that certain modifications would come within the teachings of this invention. Therefore, the following claims should be studied to determine the true scope and content of the invention.

What is claimed is:

1. A windshield washer nozzle for an automotive vehicle, comprising:
    a housing;
    a first fluid input port defined by the housing;
    a second fluid input port defined by the housing;
    at least a first flow path and a second flow path defined by the housing, the first flow path and the second flow path being in fluid communication with the respective first fluid input port and the second fluid input port, wherein a fluid at a pressure below a pressure P1 can be directed through the first fluid input port and caused to flow through the first flow path while fluid flow through the second flow path is blocked and a fluid al a pressure in excess of a pressure P2 can be directed through the second fluid input port and caused to flow through the second flow path while the fluid flow through the first flow path is blocked; and a pump coupled to the input ports, wherein the pump can be operated in a first direction to generate a pressure P2 or in a second direction to generate a pressure P1.

2. The windshield washer nozzle as defined in claim 1, wherein the pump is coupled to an electrical control center for monitoring the speed of the automotive vehicle, wherein the electrical control center causes reversal of pump rotation at a predetermined vehicle speed.

3. The windshield washer nozzle as defined in claim 1, wherein the first flow path directs a fluid spray to a first target location on an automotive vehicle windshield and the second flow path directs a fluid spray to a second target location on the automotive vehicle windshield, wherein at least a portion of the second target location is at a higher position on the windshield than the first target location.

4. The windshield washer nozzle as defined in claim 1, wherein at least a portion of the first flow path supports a first control valve and at least a portion of the second flow path supports a second flow control valve.

5. The windshield washer nozzle as defined in claim 4, wherein the first flow control valve includes a ball check in contact with a spring for biasing the ball check away from a seat to allow flow through the first flow path a pressure below a pressure P1.

6. The windshield washer nozzle as defined in claim 4, wherein the second control valve includes a ball check in contact with a spring for biasing the ball check into contact with a seat to prevent flow through the second flow path at a pressure below a pressure P2.

7. A windshield washer nozzle for an automotive vehicle, comprising:

a housing;

a first fluid input port defined by the housing;

a second fluid input port defined by the housing;

at least a first flow path and a second flow path defined by the housing, the first flow path and the second flow path being in fluid communication with the respective first fluid input port and the second fluid input port, wherein a fluid at a pressure below a pressure P1 can be directed through the first input port and caused to flow through the first flow path while flow through the second flow path is blocked and a fluid at a pressure in excess of a pressure P2 can be directed through the second input port and caused to flow through the second flow path while flow is blocked through the first flow path; and a pump in fluid communication with the first and second input ports, wherein the pump can be operated in the reverse direction to generate an operating pressure below the pressure P1 and in the forward direction to generate a second operating pressure in excess of the pressure P2.

8. The windshield washer nozzle as defined in claim 7, wherein the pressure P1 equals the pressure P2.

9. The windshield washer nozzle as defined in claim 7, further including an electronic device including software instructions for controlling the vehicle speed at which the pump will be operated in the forward or reverse directions.

10. The windshield washer nozzle as defined in claim 7, wherein the pump is electrically coupled to electronic circuitry for controlling an electrical signal to the pump for causing the pump to rotate in either the forward or reverse direction.

11. A windshield washer nozzle for an automotive vehicle, comprising:

a housing;

a first fluid input port defined by the housing;

a second fluid input port defined by the housing;

at least a first flow path and a second flow path defined by the housing, the first flow path and the second flow path being in fluid communication with the respective first fluid input port and the second fluid input port;

a first flow control valve supported by the first flow path;

a second flow control valve supported by the second flow path; and a pump in fluid communication with the input ports, wherein the pump can be operated in the reverse direction to generate an operating pressure below a pressure P1 and in the forward direction to generate a second operating pressure in excess of a pressure P2, whereby a fluid at a pressure below the pressure P1 can be directed through the first input port and caused to flow through the first flow path while flow through the second flow path is blocked and a fluid at a pressure in excess of the pressure P2 can be directed through the second input port and caused to flow through the second flow path while flow through the first flow path is blocked.

* * * * *